(12) United States Patent
Mizumi et al.

(10) Patent No.: US 12,044,629 B2
(45) Date of Patent: Jul. 23, 2024

(54) FIN TIP POSITION MEASUREMENT METHOD, FIN TIP POSITION MEASUREMENT SYSTEM, AND JIG FOR MEASURING FIN TIP POSITION

(71) Applicant: MITSUBISHI HEAVY INDUSTRIES, LTD., Tokyo (JP)

(72) Inventors: Shunsuke Mizumi, Tokyo (JP); Jose Carlos Kuroki Ramirez, Yokohama (JP); Koji Ishibashi, Yokohama (JP); Juichi Kodera, Yokohama (JP); Satoshi Kumagai, Tokyo (JP); Masaru Sekihara, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/902,337

(22) Filed: Sep. 2, 2022

(65) Prior Publication Data

US 2023/0020601 A1    Jan. 19, 2023

Related U.S. Application Data

(63) Continuation of application No. PCT/JP2021/013356, filed on Mar. 29, 2021.

(30) Foreign Application Priority Data

Mar. 31, 2020   (JP) ................. 2020-065281

(51) Int. Cl.
    *G01N 21/90*    (2006.01)
    *F01D 5/20*    (2006.01)

(52) U.S. Cl.
    CPC ........... *G01N 21/9054* (2013.01); *F01D 5/20* (2013.01)

(58) Field of Classification Search
    CPC .............. G01B 21/9054; G01B 5/0004; G01B 5/0002; G01B 21/047; G01B 11/24;
    (Continued)

(56) References Cited

U.S. PATENT DOCUMENTS

| | | | |
|---|---|---|---|
| 6,219,931 B1 * | 4/2001 | Roth .................... | G01B 5/0004 33/645 |
| 9,778,347 B2 * | 10/2017 | Kotani ................. | G01B 5/0004 |

(Continued)

FOREIGN PATENT DOCUMENTS

| | | |
|---|---|---|
| JP | 61-80005 | 4/1986 |
| JP | 8-86653 | 4/1996 |

(Continued)

OTHER PUBLICATIONS

International Search Report issued May 25, 2021 in corresponding International Application No. PCT/JP2021/013356 with English translation.

(Continued)

*Primary Examiner* — John R Lee
(74) *Attorney, Agent, or Firm* — Wenderoth, Lind & Ponack, L.L.P.

(57) ABSTRACT

This fin tip position measurement method comprises: a jig installation step for installing a jig having a flat measurement surface expanded in a circumferential direction and an axial direction to a tip of at least one among a plurality of seal fins that protrude in a radial direction with respect to an axial line, extend in the circumferential direction, and are arranged in a direction in which the axial line extends; a first measurement step for measuring a distance from the axial line to the measurement surface by scanning the measurement surface with a laser beam; and a first calculation step (Continued)

for calculating a distance from the axial line to the tip of the seal fin by adding a radial dimension of the jig to the distance to the measurement surface.

4 Claims, 5 Drawing Sheets

(58) Field of Classification Search
CPC ........ G01B 11/00; G01N 21/90; G01N 21/88; F01D 5/20; F01D 5/14; F01D 5/12; F01D 21/003; G01S 7/4817; G01S 7/481; G01C 15/06; G01C 15/02; F05D 2260/12; F05D 2240/307; F05D 2240/303; F05D 2240/30
See application file for complete search history.

(56) References Cited

U.S. PATENT DOCUMENTS

| | | | |
|---|---|---|---|
| 2013/0162971 A1* | 6/2013 | Winter | G01C 15/002 356/4.01 |
| 2015/0308826 A1* | 10/2015 | Seki | G01C 15/06 33/293 |
| 2016/0291133 A1 | 10/2016 | Kotani | |
| 2018/0142571 A1 | 5/2018 | Mizumi et al. | |
| 2018/0284230 A1* | 10/2018 | Komuro | G01S 7/4808 |
| 2019/0033061 A1 | 1/2019 | Onishi et al. | |
| 2019/0107007 A1 | 4/2019 | Yashirodai et al. | |
| 2023/0020601 A1* | 1/2023 | Mizumi | F01D 5/20 |

FOREIGN PATENT DOCUMENTS

| | | |
|---|---|---|
| JP | 2005-300478 | 10/2005 |
| JP | 2006-30164 | 2/2006 |
| JP | 2011-89427 | 5/2011 |
| JP | 2014-137273 | 7/2014 |
| JP | 5908147 | 4/2016 |
| JP | 2017-120220 | 7/2017 |
| JP | 2017-167078 | 9/2017 |
| JP | 2017-167079 | 9/2017 |
| JP | 2018-84169 | 5/2018 |
| JP | 2019-70334 | 5/2019 |
| JP | 2019-120167 | 7/2019 |
| JP | 2019-132704 | 8/2019 |

OTHER PUBLICATIONS

Written Opinion of the International Searching Authority issued May 25, 2021 in corresponding International Application No. PCT/JP2021/013356 with English translation.

Lewis et al., "Determination of misalignment and angular scale errors of a laser tracker using a new geometric model and a multi-target network approach", Proceedings of MacroScale 2011, pp. 1-16.

* cited by examiner

FIN TIP POSITION MEASUREMENT METHOD, FIN TIP POSITION MEASUREMENT SYSTEM, AND JIG FOR MEASURING FIN TIP POSITION

TECHNICAL FIELD

The present disclosure relates to a fin tip position measurement method, a fin tip position measurement system, and a jig for measuring a fin tip position.

This application claims the priority of Japanese Patent Application No. 2020-065281 filed in Japan on Mar. 31, 2020, the content of which is incorporated herein by reference.

This application is a continuation application based on a PCT Patent Application No. PCT/JP2021/013356 whose priority is claimed on Japanese Patent Application No. 2020-065281. The contents of the PCT Application is incorporated herein by reference.

BACKGROUND ART

For example, in a steam turbine, a seal fin that seals a leakage of steam is provided between a rotor that is a rotating body and a nozzle ring that is a stationary body. The seal fin may wear or fall in use over time. As a result, there is a possibility that a clearance between a tip of the seal fin and the rotor or a vane ring changes and affects the performance of the steam turbine. For this reason, it is necessary to regularly inspect a state of the seal fin. In addition, even in the case of an unused seal fin, it may be necessary to adjust a clearance when the seal fin is assembled into the turbine. As a method for evaluating the clearance of such a seal fin, a technique described in the following PTL 1 has been known.

In the evaluation method described in PTL 1, in a state where a casing is disassembled, a reflector that reflects laser is attached to a circumferential end portion of the seal fin, and the reflector is irradiated with the laser. Accordingly, a clearance of the seal fin in a vertical direction and a horizontal direction can be measured.

CITATION LIST

Patent Literature

[PTL 1] Japanese Unexamined Patent Application Publication No. 2019-120167

SUMMARY OF INVENTION

Technical Problem

However, it is difficult to stably attach the above-described reflector to the tip of the sharp seal fin. As a result, the accuracy of measurement is impaired, which is a concern. In addition, since it is necessary to redispose a large number of reflectors each time and to perform a plurality of times of measurement over an entire region to be measured, the work time is prolonged, which is a concern.

The present disclosure is conceived to solve the above problems, and an object of the present disclosure is to provide a fin tip position measurement method, a fin tip position measurement system, and a jig for measuring a fin tip position capable of easily and highly accurately measuring a fin tip position.

Solution to Problem

In order to solve the above problems, a fin tip position measurement method according to the present disclosure including: a jig attachment step of attaching a jig to a tip of at least one of a plurality of seal fins protruding in a radial direction with respect to an axis, extending in a circumferential direction, and being arranged in a direction in which the axis extends, the jig having a measurement surface having a flat shape and extending in the circumferential direction and in an axis direction; a first measurement step of measuring a distance from the axis to the measurement surface by scanning the measurement surface with laser; and a first calculation step of calculating a distance from the axis to the tip of the seal fin by adding a dimension of the jig in the radial direction to the distance to the measurement surface.

A fin tip position measurement system according to the present disclosure including: a jig that is attached to a tip of at least one of a plurality of seal fins protruding in a radial direction with respect to an axis, extending in a circumferential direction, and being arranged in a direction in which the axis extends, and that has a measurement surface having a flat shape and extending in the circumferential direction and in an axis direction; a measurement unit that measures a distance from the axis to the measurement surface by scanning the measurement surface with laser; and a calculation unit that calculates a distance from the axis to the tip of the seal fin by adding a dimension of the jig in the radial direction to the distance to the measurement surface.

A jig for measuring a fin tip position according to the present disclosure including: a holding portion that sandwiches a tip of a seal fin protruding in a radial direction with respect to an axis and extending in a circumferential direction, from both sides in an axis direction; and a body portion which is provided on a radial inner side of the holding portion and in which a measurement surface having a flat shape and extending in the circumferential direction and in the axis direction is formed.

Advantageous Effects of Invention

According to the fin tip position measurement method, the fin tip position measurement system, and the jig for measuring a fin tip position of the present disclosure, a fin tip position can be easily and highly accurately measured.

DESCRIPTION OF EMBODIMENTS (Configuration of Fin Tip Position Measurement System)

Figure 1:
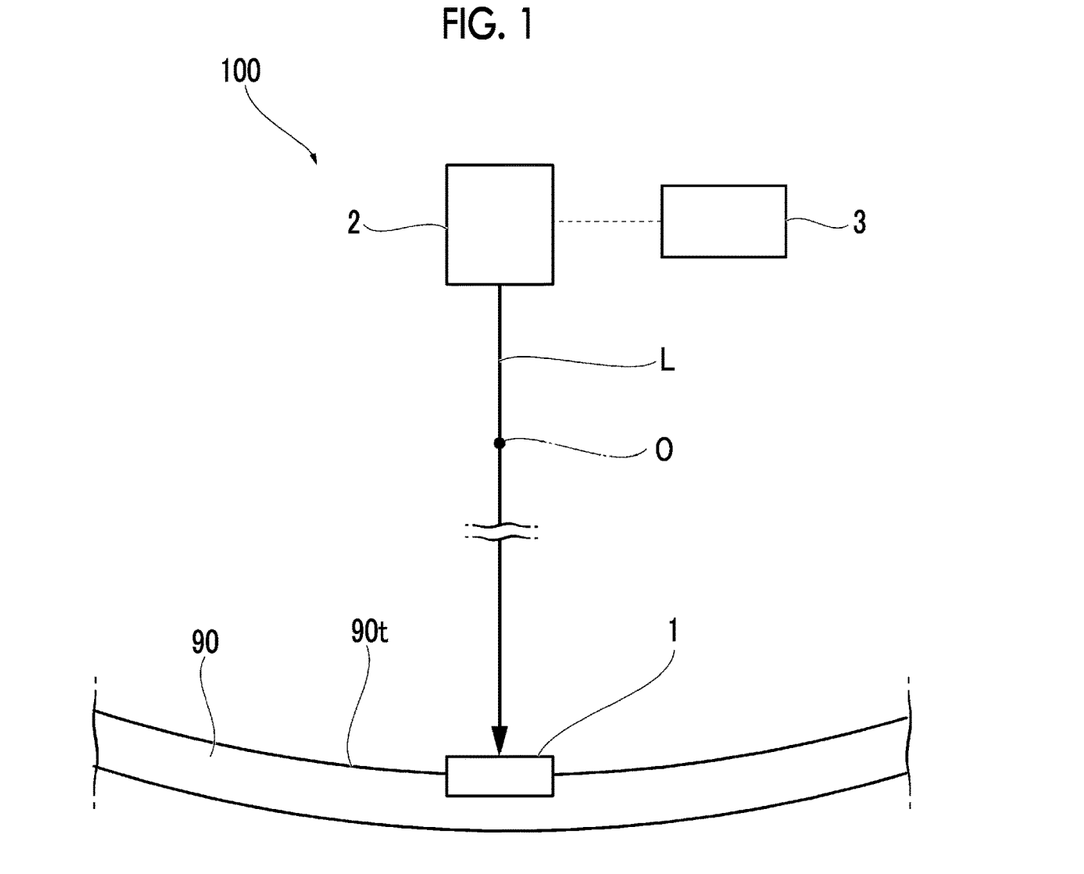
FIG. 1 is a view showing a configuration of a fin tip position measurement system according to an embodiment of the present disclosure.

Hereinafter, a fin tip position measurement system 100 (hereinafter, simply referred to as the "measurement system 100") according to an embodiment of the present disclosure will be described with reference to FIGS. 1 to 4. As shown in FIG. 1, the measurement system 100 is a device that measures a position of a tip 90*t* of a seal fin of a steam turbine. The seal fin 90 is provided to seal a leakage of steam between a casing (inner peripheral surface of a nozzle ring) (not shown) and an outer peripheral surface of a rotor. The seal fin 90 protrudes inward in a radial direction with respect to an axis O and extends in a circumferential direction. In addition, a plurality of the seal fins 90 are arranged in an axis O direction. The seal fin 90 has a triangular cross-sectional shape in which a dimension in the axis O direction is gradually reduced from a casing side toward a tip 90*t* side. Incidentally, the measurement system 100 to be described later is also applicable to seal fin provided on the outer peripheral surface of the rotor (namely, a rotor blade side fin).

The measurement system 100 includes a jig 1 (measurement jig), a measurement unit 2, and a calculation unit 3. The jig 1 is attached to the tip 90*t* of the seal fin 90. The measurement unit 2 irradiates (scans) the jig 1 with laser to measure a distance from the axis O to a measurement surface 12S (to be described later) of the jig 1.

More specifically, the measurement unit 2 includes a laser tracker disposed in the vicinity of the casing that is in an open state, and a line scanner that is movable to an arbitrary location.

The laser tracker identifies position coordinates of an imaginary axis (coordinates of the axis O) in a whole coordinate system in advance. The laser tracker can detect position coordinates of the line scanner at an arbitrary position.

The line scanner can detect position coordinates (distance image) of the jig 1 in a coordinate system with respect to the line scanner.

Then, the laser tracker performs data processing of the distance image based on the position coordinates of the line scanner in the whole coordinate system and the position coordinates of the jig 1 in the coordinate system with reference to the line scanner, to acquire a distance from the imaginary axis to the jig 1. More specifically, position coordinates of the jig 1 are calculated by extracting a point cloud corresponding to a detection portion D (to be described later) of the jig 1 from point clouds measured by the line scanner, based on mainly brightness information, and by calculating a position of the center of gravity of each coordinate of the point cloud.

The calculation unit 3 calculates a distance from the axis O to the tip 90*t* of the seal fin 90 by adding a dimension of the jig 1 in the radial direction to the value of this distance.

(Configuration of Jig)

Figure 2:
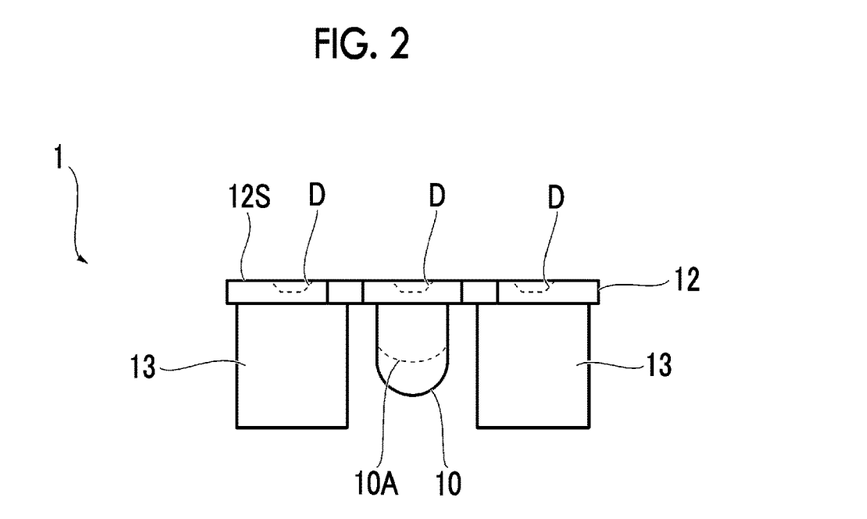
FIG. 2 is a side view showing a configuration of a jig for measuring a fin tip position according to an embodiment of the present disclosure.
Figure 4:
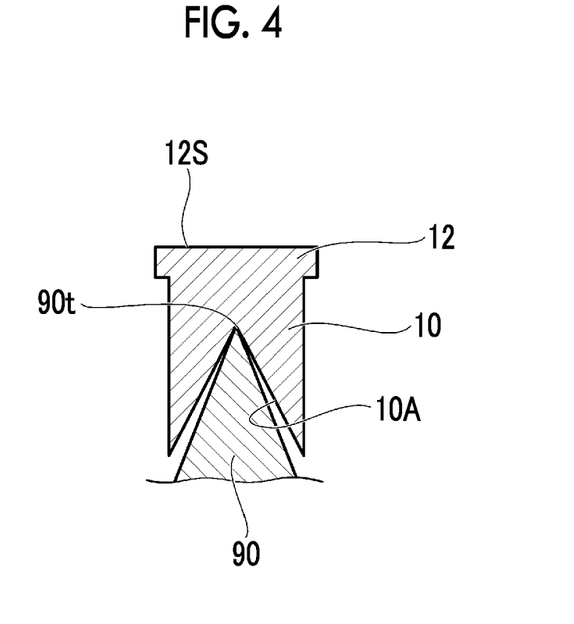
FIG. 4 is a cross-sectional view taken along line IV-IV of FIG. 3.

As shown in FIG. 2, the jig 1 includes a holding portion 10, a body portion 12, and a clip portion 13. A groove 10A recessed inward in the radial direction to sandwich the tip 90*t* of the seal fin 90 from both sides in the axis O direction is formed in the holding portion 10. In addition, as shown in FIG. 4, a dimension of the groove 10A in the axis O direction is gradually reduced from a lower side toward an upper side in a height direction of the jig 1 (the radial direction in a state where the jig 1 is attached to the seal fin 90). The jig 1 is attached such that a bottom portion of the groove 10A is aligned with the tip 90*t* of the seal fin 90.

As shown in FIG. 2, the body portion 12 has a plate shape that is integrally formed with the holding portion 10. A surface of the body portion 12 facing opposite to the holding portion 10 is the measurement surface 12S that is irradiated with laser. The measurement surface 12S has a flat shape and is normal to a height direction of the seal fin 90. A plurality (three) of recesses (detection portions D) are formed in the measurement surface 12S at equal intervals. The detection portions D are polished to exhibit a lower surface roughness than that of the measurement surface 12S. Accordingly, the detection portions D that is irradiated with laser exhibit a reflection mode different from that of the measurement surface 12S (namely, a reflection mode in which a noise component is smaller). Incidentally, as another example, instead of forming the recesses, mirror-shaped stickers can be affixed to the measurement surface 12S and used as the detection portions D.

Figure 3:
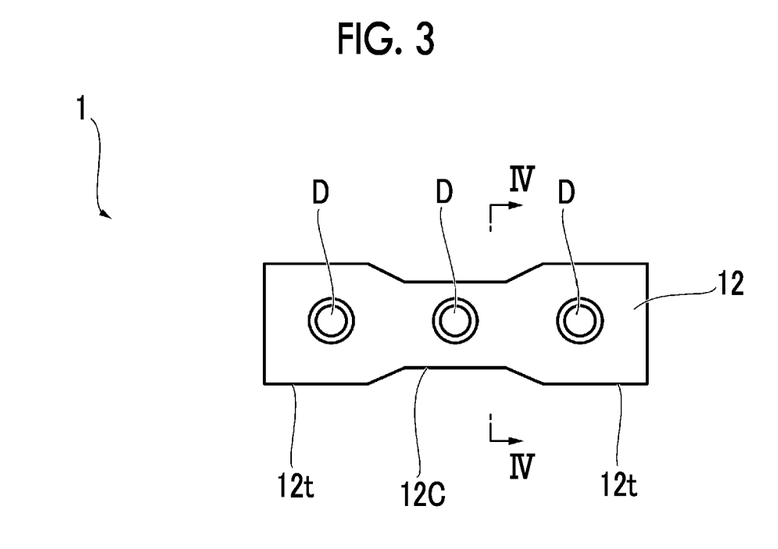
FIG. 3 is a top view showing a configuration of the jig for measuring a fin tip position according to the embodiment of the present disclosure.

In addition, as shown in FIG. 3, a central portion 12C of the body portion 12 in a longitudinal direction (the circumferential direction in a state where the jig 1 is attached to the seal fin 90) is smaller in a dimension in a lateral direction (the axis O direction in a state where the jig 1 is attached to the seal fin 90) than an end portion 12*t* in the longitudinal direction. In other words, a "constriction" is formed in the central portion 12C.

As shown in FIG. 2, the clip portion 13 has a plate shape protruding downward from a lower surface of the body portion 12 (a surface facing opposite to the measurement surface 12S). The clip portion 13 sandwiches the seal fin from both sides in the axis O direction using an elastic force. A pair of the clip portions 13 are provided at an interval in the circumferential direction.

(Fin Tip Position Measurement Method)

Subsequently, a fin tip position measurement method using the measurement system 100 will be described with reference to FIGS. 5 to 7. As shown in FIG. 7, this measurement method includes a jig attachment step S1, a first measurement step S2, a first calculation step S3, a second measurement step S4, and a second calculation step S5.

Figure 5:
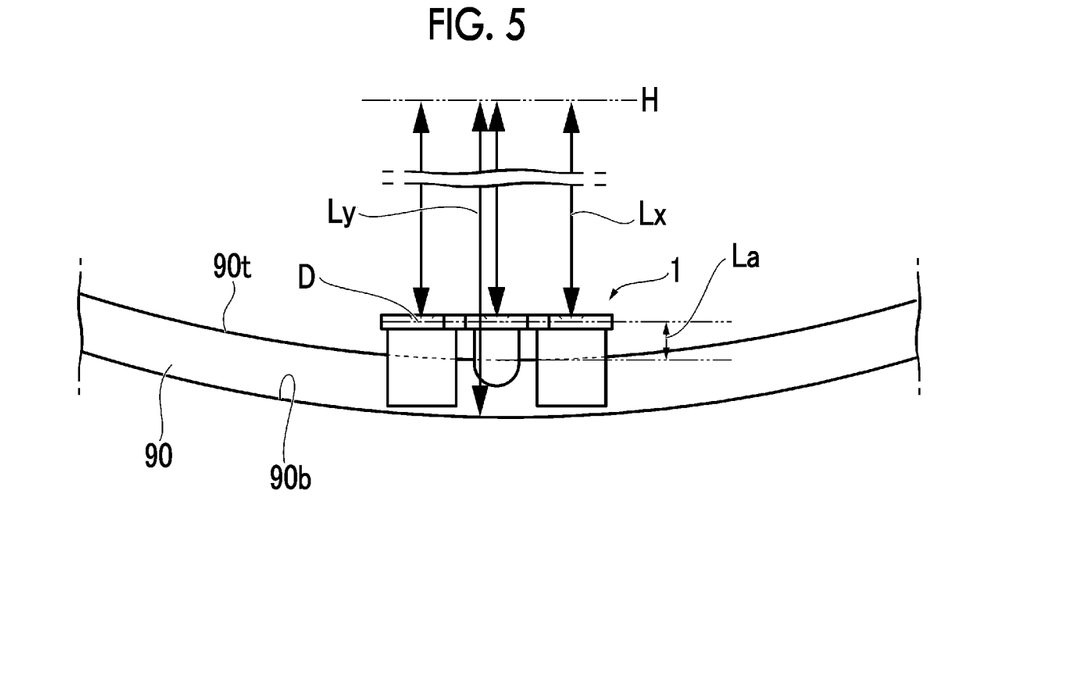
FIG. 5 is a descriptive view showing a state where the jig for measuring a fin tip position according to the embodiment of the present disclosure is attached to a seal fin.

In the jig attachment step S1, as shown in FIG. 5, the above-described jig 1 is attached to the tip 90*t* of the seal fin 90. Specifically, the clip portions 13 sandwich the seal fin 90 from both sides in the axis O direction. At this time, the bottom portion of the groove 10A is in contact with the tip 90*t*. Next, in the first measurement step S2, laser L is irradiated from the above-described measurement unit 2 toward the jig 1.

Accordingly, a distance Lx from the axis O that is an imaginary center axis of the rotor (not shown) to the detection portions D is measured. Incidentally, a broken line H in FIG. 5 schematically shows a height position of the axis O. In the first measurement step S2, it is desirable that a distance from the axis O to each of the three detection portions D is measured, and an average value of three measured values is acquired as the above-described distance Lx. Specifically, as will be described later, since an outer shape of the jig 1 differs between the central portion 12C and both end portions 12t, when scanning with laser is performed to obtain measurement results (reflection images), a position of the detection portion D located at the central portion 12C among the three detection portions D is determined from the measurement results, and positions of the other two detection portions D are specified based on the determination. The average value is calculated from three measurement results.

In the first calculation step S3, the calculation unit 3 adds a dimension La of the jig 1 in the radial direction obtained in advance, to the above-described distance Lx. Incidentally, the dimension La refers to a dimension from a bottom surface of the detection portion D to the bottom portion of the groove 10A. As described above, the bottom portion of the groove 10A is in contact with the tip 90t of the seal fin 90. Therefore, the distance from the axis O to the tip 90t can be obtained by adding the distance Lx and the dimension La.

In the second measurement step S4, a distance Ly from the axis O to a bottom surface 90b between a plurality of the seal fins 90 is further measured by scanning the bottom surface 90b with laser. At this time, the laser is irradiated from a side of the central portion 12C of the body portion 12 toward the bottom surface 90b. Namely, since the central portion 12C is constricted as described above, the laser can reach the bottom surface 90b without a path of the laser being interfered with. More specifically, since the constriction is formed, for example, even when an attachment posture of the jig 1 is inclined in the axis O direction, even when the line scanner does not face the jig 1 squarely and the measurement surface 12S is obliquely irradiated with the laser, or even when an interval between the seal fins 90 is relatively small, it is possible to reduce the possibility that the bottom surface 90b is in a blind spot of the jig 1.

In the second calculation step S5, a distance Lx+La to the tip 90t of the seal fin 90 is subtracted from the distance Ly from the axis O to the bottom surface 90b. Accordingly, a dimension of the seal fin 90 in the radial direction is calculated. For example, the amount of wear of the seal fin 90 is acquired by comparing this dimension to a design value of the seal fin 90.

Figure 6:
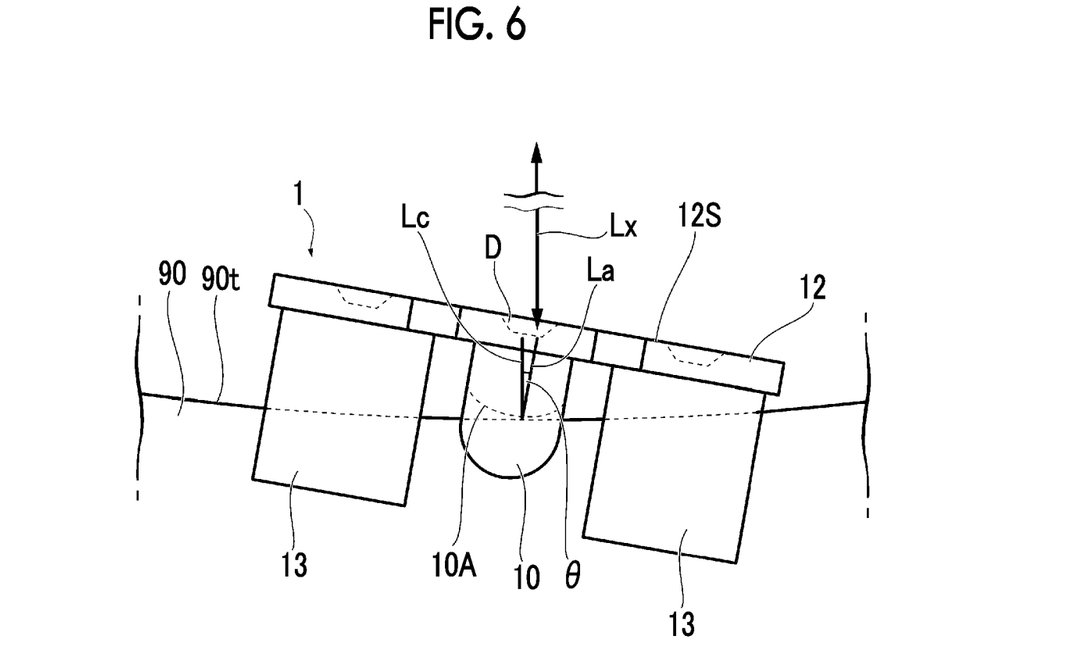
FIG. 6 is a descriptive view showing a mode of measurement when the jig for measuring a fin tip position according to the embodiment of the present disclosure is attached to the seal fin in an inclined state.
Figure 7:
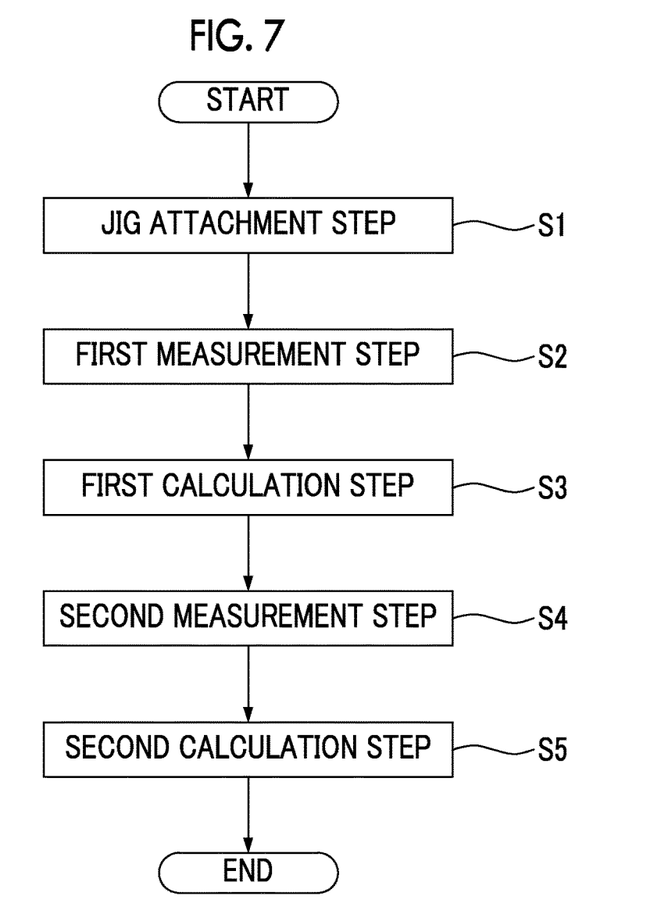
FIG. 7 is a flowchart of a fin tip position measurement method according to an embodiment of the present disclosure.

Incidentally, as shown in FIG. 6, it can also be considered that the jig 1 is attached in a state of being inclined with respect to the radial direction. In this case, in the first measurement step S2, an inclination angle θ is measured by comparing the measurement results obtained by the three detection portions D to each other. Next, in the first calculation step S3, the calculation unit 3 calculates a value of the cosine of the dimension La of the jig 1 in the radial direction with respect to the inclination angle θ (Lc=cos θ). Further, the calculation unit 3 calculates a value corrected for the influence of the inclination of the jig 1 by adding the above-described distance Lx to the value of Lc.

Each of the above steps is repeated a plurality of times at an arbitrary position in the circumferential direction on the seal fin 90. Accordingly, the position of the tip 90t is measured over the entirety of the seal fin 90. Here, when a plurality of the jigs 1 are prepared, the plurality of jigs 1 are installed, and measurements are performed at the same time, the number of measurements can be reduced.

(Actions and Effects)

According to this method and this configuration, first, the distance Lx from the axis O that is the center axis of the rotor to the measurement surface 12S (detection portions D) is measured by scanning the measurement surface 12S of the jig 1 with laser in a direction that substantially coincides with a normal direction of the measurement surface 12S of the jig 1. Next, the distance from the axis O to the tip 90t of the seal fin 90 is calculated by adding the dimension La of the jig 1 in the radial direction to the distance to the detection portions D. Here, when the jig 1 having the measurement surface 12S (detection portions D) as described above is not used, it is difficult to exactly irradiate the tip 90t of the sharp seal fin 90 with laser, and it is not easy to set the tip 90t as a measurement target. A reflector is attached to the tip 90t of the seal fin 90, and irradiation can be performed, but it is particularly difficult to dispose the reflector such that a relative positional relationship between the position of the tip 90t of the sharp seal fin 90 which wants to be measured and a position actually measured using laser can be exactly set or identified, so that it is difficult to secure accuracy. However, according to this method, the measurement surface 12S having a certain area and being normal to the height direction of the seal fin 90 is irradiated (scanned) with the laser in substantially the normal direction of the measurement surface 12S, so that in addition to the fact that the laser is not blocked by a casing structure such as bolts, without taking into consideration an irradiation position of the laser more than necessary, the position of the tip 90t of the seal fin 90 can be reliably identified, and a deviation between the position that wants to be measured and the actual measurement position can be easily and exactly corrected. In addition, in this method, as long as the reflectivity of the detection portions D and even the accuracy of the dimension La are managed, even when the manufacturing accuracy of other portions of the jig 1 is relatively coarse, a measurement can be performed with sufficiently high accuracy. In other words, when compared to the reflector in the related art, it is possible to reduce the number of dimensions that have to be managed and to suppress the manufacturing cost to a low level. For this reason, it is easy to prepare a large number of the jigs 1 in advance. As a result, it is possible to perform a measurement using a large number of the jigs 1 at a time, and it is possible to realize a reduction in the times of measurement (namely, shortening the measurement time).

Further, according to this method and this configuration, the distance from the axis O to the bottom surface 90b between the seal fins 90 is measured by scanning the bottom surface 90b with laser. The dimension of the seal fin 90 in the radial direction can be calculated by subtracting the distance (Lx+La) between the tip 90t of the seal fin 90 and the axis O from this distance. The amount of wear of the seal fin 90 can be obtained by comparing this dimension to, for example, the design value of the seal fin 90.

In addition, according to this method and this configuration, even when the jig 1 is attached in an inclined state and the normal direction of the measurement surface 12S does not exactly coincide with the height direction of the seal fin 90, a measured value of the distance from the axis O to the measurement surface 12S (detection portions D) can be corrected based on the inclination angle θ. Namely, when the jig 1 is attached to the seal fin, a measurement can be easily performed without taking into consideration the posture or angle of the jig 1 more than necessary.

In addition, according to the jig 1, since the detection portions D having a reflection mode for laser different from that of other portions are formed, the position of the detection portions D can be more easily and accurately detected using the laser. In addition, since the plurality of detection portions D are formed, the position of the tip of the seal fin 90 can be more accurately measured by averaging a plurality of detection results.

Further, according to the jig 1, since the dimension of the central portion 12C of the body portion 12 is smaller than that of both the end portions 12*t*, when the jig 1 is scanned with laser, the position of the central portion 12C of the body portion 12 (namely, one located at the center among the plurality of detection portions D) can be specified. For example, even if some of the plurality of detection portions D cannot be detected, it is possible to identify which of the remaining detection portions D can be detected. As a result, even when there is some trouble with a measurement environment, measurement results can be obtained and the reliability of the data can be taken into consideration.

Other Embodiments

Figure 8:
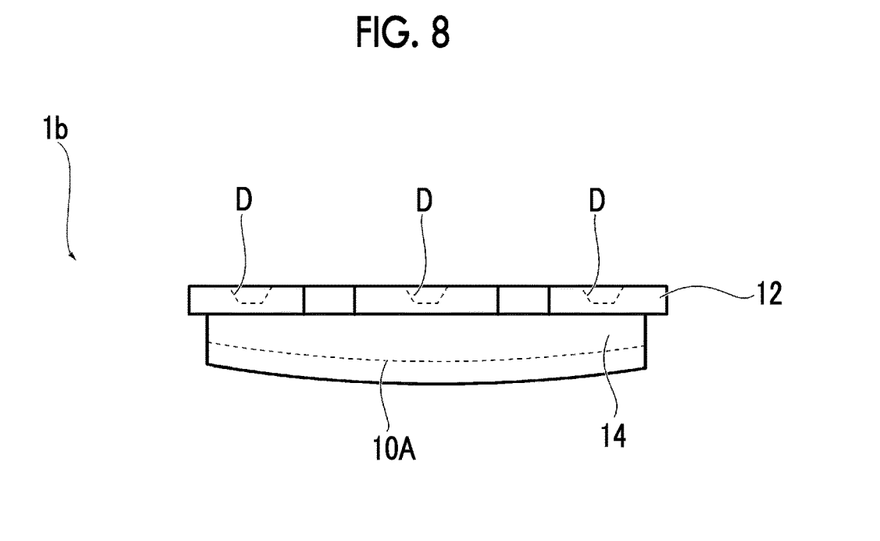
FIG. 8 is a side view showing a modification example of the jig for measuring a fin tip position according to the embodiment of the present disclosure.
Figure 9:
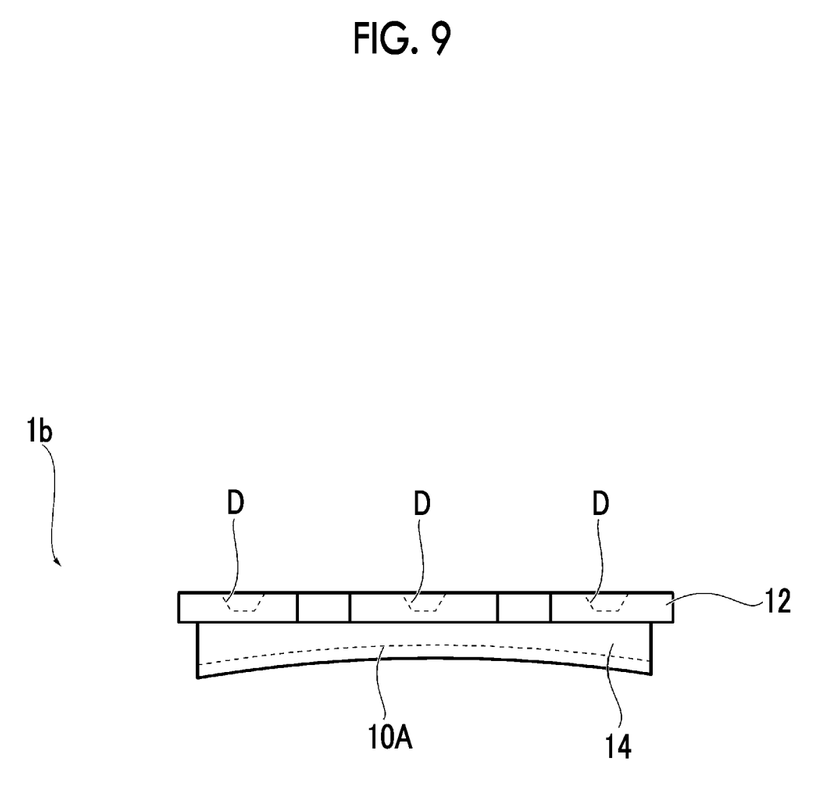
FIG. 9 is a side view showing a further modification example of the jig for measuring a fin tip position according to the embodiment of the present disclosure.

The embodiment of the present disclosure has been described above in detail with reference to the drawings, but the specific configurations are not limited to the embodiment and include a design change and the like that are made without departing from the concept of the present disclosure. For example, as a modification example of the jig 1, a configuration shown in FIG. 8 can also be adopted. In the example of the same drawing, a shape of a holding portion 14 of a jig 1*b* is different from that of the embodiment. In addition, the jig 1*b* does not include the above-described clip portions 13. An end edge of the holding portion 14 is curved according to a curved shape of the tip 90*t* of the seal fin 90. Incidentally, in the example of FIG. 8, the holding portion 14 has a curved shape protruding downward, to correspond to the seal fin 90 provided on an inner peripheral side of the casing. On the other hand, when the jig 1*b* is applied to a seal fin provided on the outer peripheral surface of the rotor, it is desirable that the holding portion 14 has a curved shape protruding upward as shown in FIG. 9. According to such a configuration, since the jig 1*b* can be even more simplified, the manufacturing cost of the jig 1*b* can be reduced.

[Additional Notes]

The fin tip position measurement method, the fin tip position measurement system 100, and the jig for measuring a fin tip position described in each embodiment are identified, for example, as follows.

(1) A fin tip position measurement method according to a first aspect including: a jig attachment step S1 of attaching a jig 1 to a tip 90*t* of at least one of a plurality of seal fins 90 protruding in a radial direction with respect to an axis O, extending in a circumferential direction, and being arranged in a direction in which the axis O extends, the jig 1 having a measurement surface 12S having a flat shape and extending in the circumferential direction and in an axis O direction; a first measurement step S2 of measuring a distance Lx from the axis O to the measurement surface 12S by scanning the measurement surface 12S with laser; and a first calculation step S3 of calculating a distance from the axis O to the tip 90*t* of the seal fin 90 by adding a dimension La of the jig 1 in the radial direction to the distance Lx to the measurement surface 12S.

According to this method, the measurement surface 12S having a certain area is irradiated (scanned) with the laser, so that a position of the tip of the seal fin 90 can be easily obtained without taking into consideration an irradiation position of the laser more than necessary.

(2) The fin tip position measurement method according to a second aspect may further include a second measurement step S4 of measuring a distance Ly from the axis O to a bottom surface 90*b* between the seal fins 90 by scanning the bottom surface 90*b* with the laser; and a second calculation step S5 of calculating a dimension of the seal fin 90 in the radial direction by subtracting the distance Lx+La to the tip 90*t* of the seal fin 90 from the distance Ly to the bottom surface 90*b*.

According to this method, the distance Ly from the axis O to the bottom surface 90*b* between the seal fins 90 is measured by scanning the bottom surface 90*b* with the laser. The dimension of the seal fin 90 in the radial direction can be calculated by subtracting the distance Lx+La between the tip 90*t* of the seal fin 90 and the axis O from the distance Ly.

(3) In the fin tip position measurement method according to a third aspect, in the first measurement step S2, an inclination angle θ of the jig 1 with respect to the radial direction may be further measured, and the distance from the axis O to the measurement surface 12S may be corrected based on the inclination angle.

According to this method, even when the jig 1 is attached in an inclined state, a measured value of the distance from the axis O to the measurement surface 12S can be corrected based on the inclination angle θ.

(4) A fin tip position measurement system 100 according to a fourth aspect includes: a jig 1 that is attached to a tip 90*t* of at least one of a plurality of seal fins 90 protruding in a radial direction with respect to an axis O, extending in a circumferential direction, and being arranged in a direction in which the axis O extends, and that has a measurement surface 12S having a flat shape and extending in the circumferential direction and in an axis O direction; a measurement unit 2 that measures a distance Lx from the axis O to the measurement surface 12S by scanning the measurement surface 12S with laser; and a calculation unit 3 that calculates a distance from the axis O to the tip 90*t* of the seal fin 90 by adding a dimension La of the jig 1 in the radial direction to the distance Lx to the measurement surface 12S.

According to this configuration, the measurement surface 12S having a certain area is irradiated (scanned) with the laser, so that a position of the tip of the seal fin 90 can be easily obtained without taking into consideration an irradiation position of the laser more than necessary.

(5) In the fin tip position measurement system 100 according to a fifth aspect, the measurement unit 2 may further measure a distance Ly from the axis O to a bottom surface 90*b* between the seal fins 90 by scanning the bottom surface 90*b* with the laser, and the calculation unit 3 may further calculate a dimension of the seal fin 90 in the radial direction by subtracting the distance Lx+La to the tip 90*t* of the seal fin 90 from the distance Ly to the bottom surface 90*b*.

According to this configuration, the measurement unit 2 measures the distance Ly from the axis O to the bottom surface 90*b* between the seal fins 90 by scanning the bottom surface 90*b* with the laser. The calculation unit 3 can calculate the dimension of the seal fin 90 in the radial direction by subtracting the distance Lx+La between the tip 90*t* of the seal fin 90 and the axis O from the distance Ly.

(6) In the fin tip position measurement system 100 according to a sixth aspect, the measurement unit 2 may further measure an inclination angle θ of the jig 1 with respect to the radial direction and correct the distance from the axis O to the measurement surface 12S based on the inclination angle θ.

According to this configuration, even when the jig 1 is attached in an inclined state, a measured value of the distance from the axis O to the measurement surface 12S can be corrected based on the inclination angle θ.

(7) A jig for measuring a fin tip position (jig 1) according to a seventh aspect includes: a holding portion 10 that sandwiches a tip 90*t* of a seal fin 90 protruding in a radial direction with respect to an axis O and extending in a circumferential direction, from both sides in an axis O direction; and a body portion 12 which is provided on a radial inner side of the holding portion 10 and in which a measurement surface 12S having a flat shape and extending in the circumferential direction and in the axis O direction is formed.

According to this configuration, the jig 1 is disposed such that the holding portion 10 sandwiches the tip 90*t* of the seal fin 90, so that the jig 1 can easily and stably hold the tip 90*t*. Further, the measurement surface 12S having a flat shape and having a certain area is formed in the body portion 12. Accordingly, a position of the tip of the seal fin 90 can be more easily and accurately measured without taking into consideration the irradiation accuracy of the laser more than necessary.

(8) In the jig for measuring a fin tip position (jig 1) according to an eighth aspect, a plurality of detection portions D exhibiting a reflection mode for laser different from a reflection mode of other portions may be formed in the measurement surface 12S.

According to this configuration, since the detection portions D having a reflection mode for the laser different from that of other portions are formed, positions of the detection portions D can be more easily and accurately detected using the laser. In addition, since the plurality of detection portions D are formed, the position of the tip of the seal fin 90 can be more accurately measured by averaging a plurality of detection results.

(9) In the jig for measuring a fin tip position (jig 1) according to a ninth aspect, a central portion 12C of the body portion 12 in the circumferential direction may be smaller in a dimension in the axis O direction than both end portions 12*t* of the body portion 12 in the circumferential direction.

According to this configuration, since the dimension of the central portion 12C of the body portion 12 is smaller than that of both the end portions 12*t*, when the jig 1 is scanned with the laser, a position of the central portion 12C (namely, one located at the center among the plurality of detection portions D) can be specified. In addition, the laser can reach the bottom surface 90*b* without a path of the laser being interfered with.

INDUSTRIAL APPLICABILITY

According to the fin tip position measurement method, the fin tip position measurement system, and the jig for measuring a fin tip position of the present disclosure, a fin tip position can be easily and highly accurately measured.

REFERENCE SIGNS LIST

100 Measurement system
1,1*b* Jig
2 Measurement unit
3 Calculation unit
10, 14 Holding portion
10A Groove
12 Body portion
12C Central portion
12S Measurement surface
12*t* End portion
13 Clip portion
90 Seal fin
90*b* Bottom surface
90*t* Tip
D Detection portion

What is claimed is:

1. A jig for measuring a fin tip position comprising:
   a holding portion that sandwiches a tip of a seal fin protruding in a radial direction with respect to an axis of a rotor and extending in a circumferential direction, from both sides in an axis direction of the rotor; and
   a body portion which is provided on a radial inner side of the holding portion and in which a measurement surface is formed, the measurement surface having a flat shape and extending in the circumferential direction and in the axis direction,
   wherein the holding portion is formed on a groove recessed inward in the radial direction to sandwich the tip of the seal fin from both sides in the axis direction, and
   a dimension of the groove in the axis direction is gradually reduced from an outward side toward an inward side in the radial direction of the jig.

2. The jig for measuring a fin tip position according to claim 1,
   wherein a plurality of detection portions exhibiting a reflection mode for laser different from a reflection mode of other portions are formed in the measurement surface.

3. The jig for measuring a fin tip position according to claim 1,
   wherein a central portion of the body portion in the circumferential direction is smaller in a dimension in the axis direction than both end portions of the body portion in the circumferential direction.

4. The jig for measuring a fin tip position according to claim 2,
   wherein a central portion of the body portion in the circumferential direction is smaller in a dimension in the axis direction than both end portions of the body portion in the circumferential direction.

\* \* \* \* \*